US011281162B2

(12) United States Patent
Lenoir

(10) Patent No.: US 11,281,162 B2
(45) Date of Patent: Mar. 22, 2022

(54) SHOCK INDICATOR FOR WATCHES

(71) Applicant: Montres Breguet S.A., L'Abbaye (CH)

(72) Inventor: Deirdre Lenoir, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 833 days.

(21) Appl. No.: 16/021,070

(22) Filed: Jun. 28, 2018

(65) Prior Publication Data

US 2019/0011888 A1   Jan. 10, 2019

(30) Foreign Application Priority Data

Jul. 6, 2017   (EP) ..................... 17180057

(51) Int. Cl.
*G04B 47/06*   (2006.01)
*G04B 43/00*   (2006.01)
(Continued)

(52) U.S. Cl.
CPC ............... *G04B 47/06* (2013.01); *G01P 1/07* (2013.01); *G01P 15/036* (2013.01); *G01P 15/0891* (2013.01); *G04B 43/002* (2013.01)

(58) Field of Classification Search
CPC ... G04B 47/06; G04B 43/002; G01P 15/0891; G01P 1/07; G01P 15/036; G01P 15/02
See application file for complete search history.

(56) References Cited

U.S. PATENT DOCUMENTS 6,357,382 B1 *   3/2002   Clark ................... G08B 3/10
                                              116/137 R
6,698,272 B1 *   3/2004   Almirante ............. G01K 3/00
                                              374/E3.001

(Continued)

FOREIGN PATENT DOCUMENTS

CH   701 867 A1   3/2011
JP   2001-99854 A   4/2001
(Continued)

OTHER PUBLICATIONS

European Search report dated Jan. 18, 2018 in European Application 17180057.6, filed on Jul. 6, 2017 ( with English translation of categories of Cited Documents).

(Continued)

*Primary Examiner* — Nimeshkumar D Patel
*Assistant Examiner* — Tania Courson
(74) *Attorney, Agent, or Firm* — Oblon, McClelland, Maier & Neustadt, L.L.P.

(57) ABSTRACT

Shock indicator device for a watch, internal to the watch, including a structure, to which is fixed an inertia block by means of at least one connecting element made of elastic or ductile or breakable material, which is elastically and plastically deformable when movements are imparted to the inertia block, this inertia block being movable in proximity to a fixed opposing surface comprised in the structure itself or in another element of a watch case, and arranged to come into contact with this opposing surface, to impart a proof indicator of impact or a permanent deformation or damage to the inertia block and/or to the connecting element and/or to the opposing surface, and/or to a breakable element incorporated in the shock indicator device), when the acceleration imparted to this inertia block is higher than a given acceleration threshold.

23 Claims, 3 Drawing Sheets

(51) Int. Cl.
*G01P 15/08* (2006.01)
*G01P 15/03* (2006.01)
*G01P 1/07* (2006.01)

(56) References Cited

U.S. PATENT DOCUMENTS

| | | | |
|---|---|---|---|
| 7,409,851 B2* | 8/2008 | Ilic | G01N 29/022 |
| | | | 422/82.01 |
| 8,074,489 B2* | 12/2011 | Ishikawa | G01P 15/03 |
| | | | 73/12.04 |
| 8,234,994 B1 | 8/2012 | Branch | |
| 9,291,511 B2* | 3/2016 | Gibson | G01L 1/044 |
| 9,316,550 B2* | 4/2016 | Frangi | G01P 15/135 |
| 10,394,192 B2* | 8/2019 | Ji | G06F 3/03547 |
| 2011/0139060 A1* | 6/2011 | Sheau-Shi | G01P 15/06 |
| | | | 116/203 |
| 2012/0227463 A1 | 9/2012 | Branch | |
| 2012/0227661 A1 | 9/2012 | Branch et al. | |
| 2012/0291694 A1 | 11/2012 | Branch | |
| 2013/0247814 A1 | 9/2013 | Branch | |
| 2015/0034003 A1 | 2/2015 | Branch et al. | |
| 2015/0082861 A1 | 3/2015 | Gibson et al. | |
| 2015/0265214 A1* | 9/2015 | De Kok | A61B 5/681 |
| | | | 600/301 |

FOREIGN PATENT DOCUMENTS

| | | | | |
|---|---|---|---|---|
| JP | 2001099857 A | * | 4/2001 | |
| WO | WO-2008060003 A1 | * | 5/2008 | G01P 15/06 |

OTHER PUBLICATIONS

Combined Chinese Office Action and Search Repott dated Jun. 11, 2020, in Patent Application No. 201810731732.6 (with English translation), 13 pages.

* cited by examiner

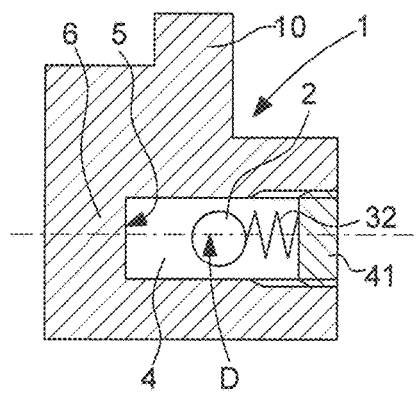
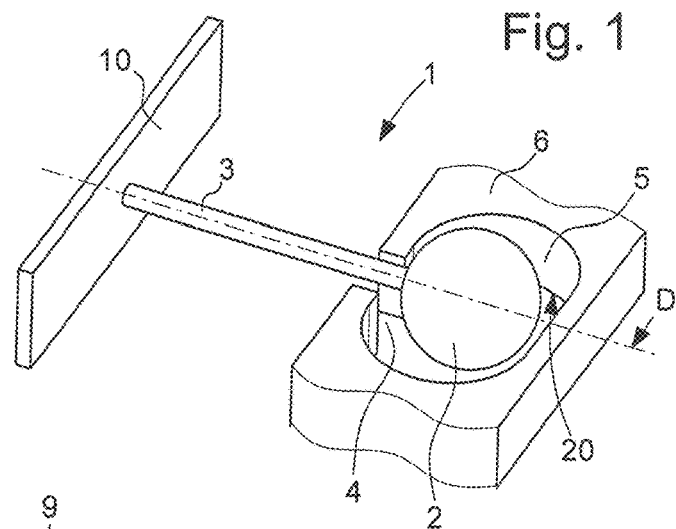
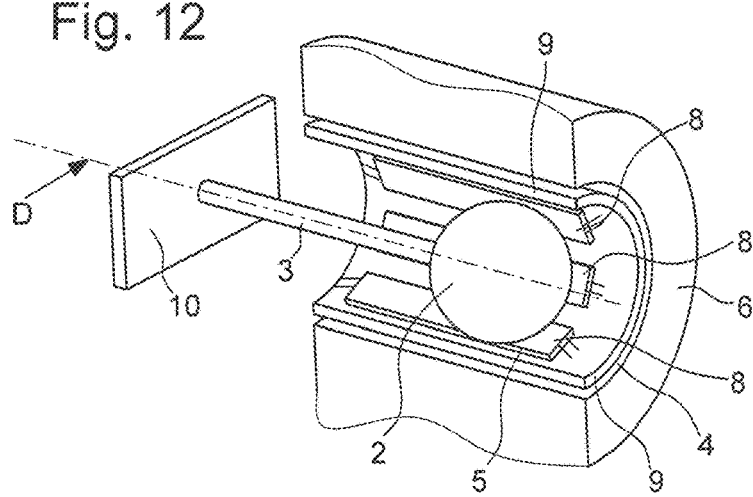
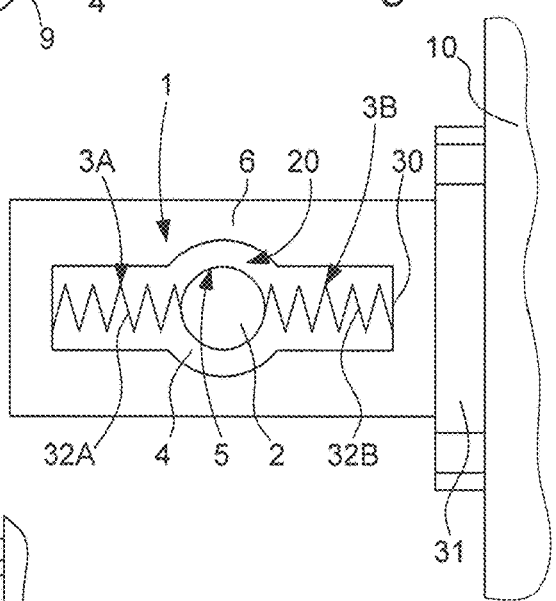
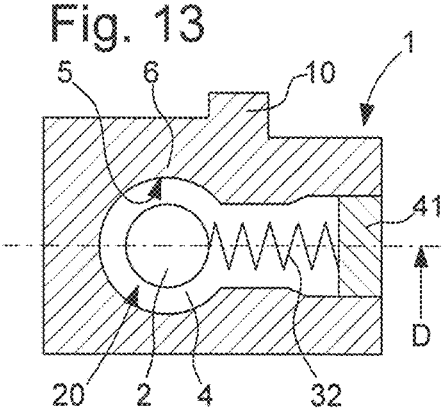
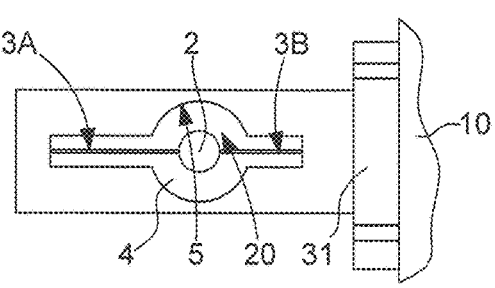

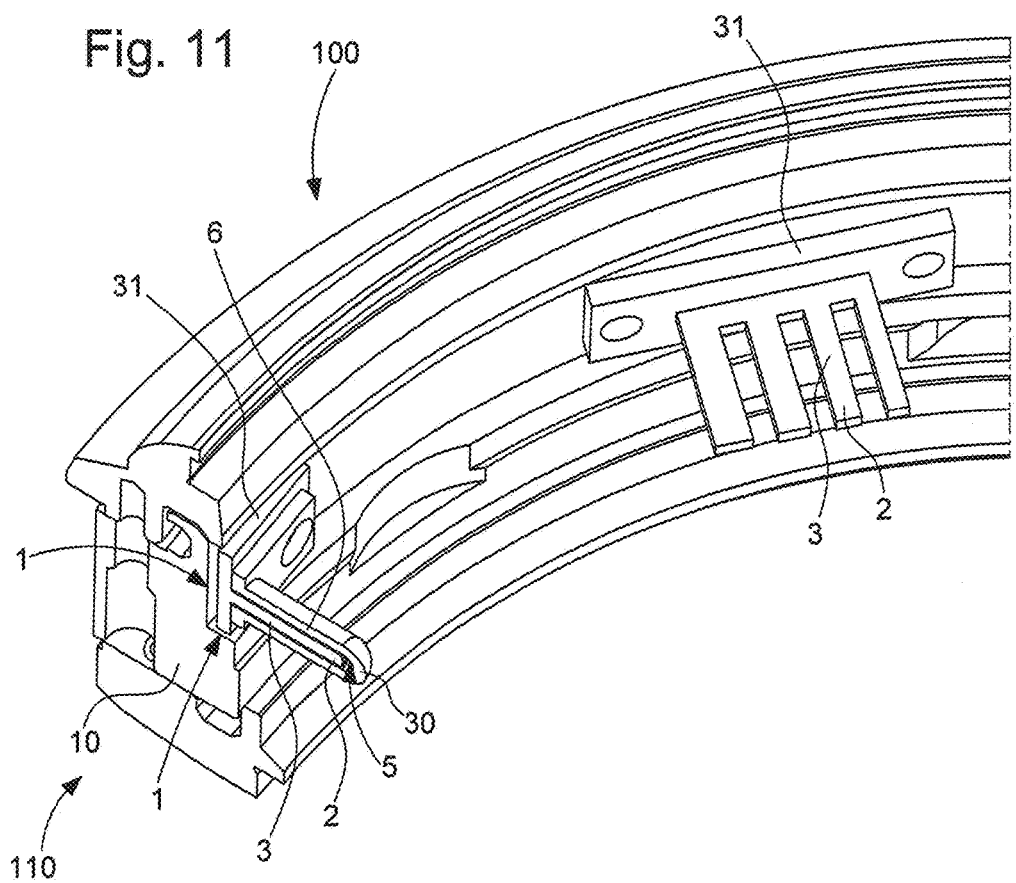
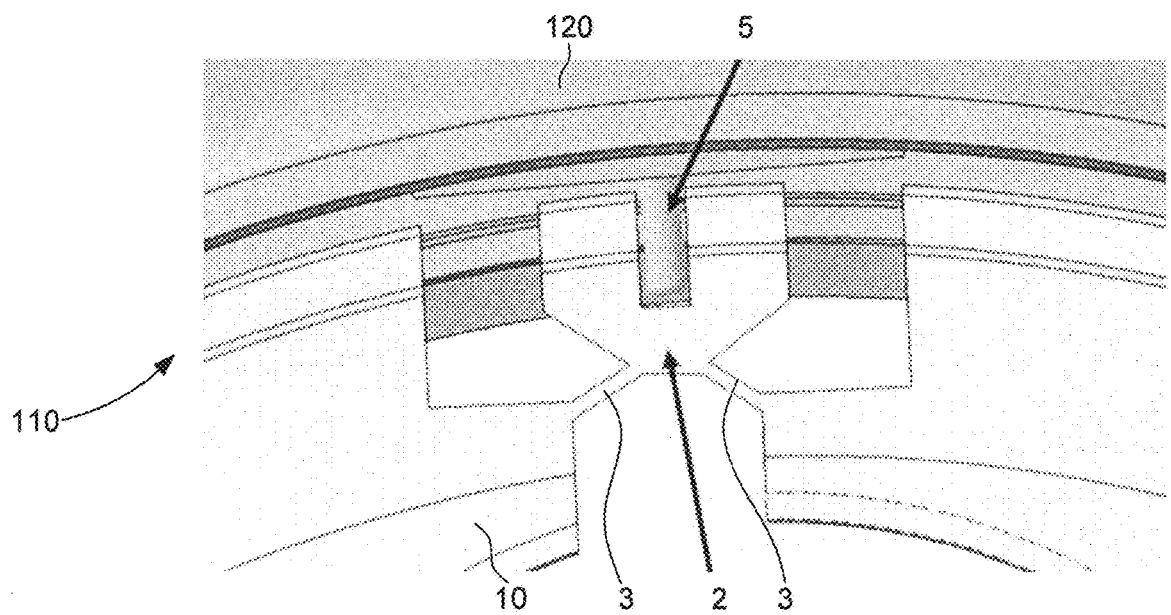

SHOCK INDICATOR FOR WATCHES

This application claims priority from European patent application No. 17180057.6 filed on Jul. 6, 2017, the entire disclosure of which is hereby incorporated herein by reference.

FIELD OF THE INVENTION

The invention concerns a shock indicator device for watches, arranged to be inserted inside a watch, and comprising a structural element, to which at least one inertia block is attached by means of at least one connecting element made of elastic or ductile or breakable material, which is elastically or plastically deformable when movements are imparted to said at least one inertia block.

The invention also concerns a watch including at least one such shock indicator.

The invention concerns the field of watches, and more particularly expert after-sales service for expensive watches requiring precautions for use, such as highly complicated watches or suchlike.

BACKGROUND OF THE INVENTION

Shocks are a recurrent problem in the watch industry. Watches are certified for resistance to being dropped from a certain height according to several NIHS (Swiss Watch Industry) standards. However, it is difficult, in practice, to quantify the actual accelerations experienced by the watch during an impact. During research projects on shocks, or during certification testing (of the external parts or movement) conducted in a laboratory, the value of this maximum acceleration is obtained by means of several expensive measuring devices and procedures that are difficult to implement.

However, there is no device allowing quick and easy access to this information. Further, in case of customer return, the after-sales service personnel have no information about the history of a timepiece or the shocks it has experienced. Such an indication would sometimes allow the problem, and any damage that has occurred inside the movement, to be identified more quickly.

Swiss Patent Application No. CH701867A1 in the name of Manufacture Horlogére de la Vallée de Joux discloses a watch that includes a device for measuring and indicating a magnitude relating to an acceleration experienced by the wristwatch, this device comprising a member for indicating the magnitude, a movable weight arranged to drive the indicator member, and an elastic means arranged to affect the movement of the movable weight, said weight being mounted to move by inertia when the wristwatch is subjected to an acceleration, from a rest position in an opposite direction to the action exerted by the elastic means, in order to drive the indicator member in a movement whose amplitude is a function of the momentary movement of the weight.

SUMMARY OF THE INVENTION

The invention proposes to develop a shock indicator for watches, which is inside the watch, accessible only after disassembling the watch, reliable and inexpensive, and which is a reliable indicator of the maximum acceleration experienced by the watch during testing or customer use.

To this end, the invention concerns a shock indicator device for watches according to claim 1.

The invention also concerns a watch including at least one such shock indicator.

BRIEF DESCRIPTION OF THE DRAWINGS

Other features and advantages of the invention will appear upon reading the following detailed description, with reference to the annexed drawings, in which:

FIG. 1 represents a schematic and perspective view of a shock indicator device according to the invention, intended to be incorporated in a watch, and comprising a visual shock proof indicator composed of a movable inertia-block inside a housing facing an inner surface of the housing, and in immediate proximity thereto, this inertia block being suspended to an elastic connecting element fixed in a structure, and arranged to produce a permanent mark, either on the inner surface of the housing, or on the periphery of the inertia block itself, in the event of a significant shock to the watch, when the acceleration imparted to the inertia block is higher than a given lower acceleration threshold.

FIG. 10 represents a schematic and cross-sectional view of another variant, wherein, in this case, the structure is a watch case middle with a cylindrical housing in the thickness thereof, inside which an inertia block is suspended to a helical spring fitted inside a cap screwed into the case middle, on the side inaccessible to the user.

FIG. 11 represents a schematic, cutaway perspective view of another variant, wherein the structure is also a watch case middle, on which is placed, on the side inaccessible to the user, a first insert containing a shock proof indicator according to the invention, and wherein the base of a second insert, whose outer portion is not represented, carries a comb element comprising several inertia blocks, each at the end of a connecting element.

FIG. 12 represents a schematic, cutaway perspective view of another variant with a cylindrical housing comprising several breakable elements, which are similar to that of FIG. 6, arranged on the generatrices of the housing, and between which a similar inertia block can move.

FIG. 13 represents, in a similar manner to FIG. 10, another similar variant, wherein the housing is spherical.

FIG. 14 represents, in a similar manner to FIG. 13, another similar variant, wherein the inertia block is suspended to several connecting elements, and wherein the shock indicator assembly is inside an insert placed on the structure, in a similar manner to FIG. 11.

FIG. 15 represents, in a similar manner to FIG. 14, another similar variant, wherein the inertia block is suspended to two wires, and wherein the shock indicator assembly is inside an insert placed on the structure.

FIG. 16 represents, in a similar manner to FIG. 11, another variant, which is the reverse of the other illustrated variants, wherein a watch plate includes two flexible strips forming a V-shape and which together carry a U-shaped inertia block, which surrounds a pin fixed in the case middle and which bears the opposing surface.

DETAILED DESCRIPTION OF PREFERRED EMBODIMENTS

Figure 2:
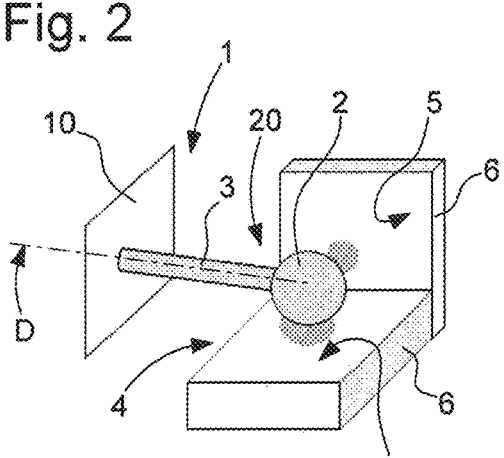
FIG. 2 represents, in a similar manner to FIG. 1, another variant of the shock indicator device, wherein only one part of the housing is shown, in the form of a dihedron, and wherein the inertia block is less ductile than the walls of the housing, which are irreversibly deformed during an impact.

The invention thus concerns a shock indicator device 1 for a watch 100, arranged to be inserted inside a watch.

The invention has several possible variants.

The basic mechanism includes at least one inertia block 2 fixed to at least one connecting element 3. In a particular embodiment, this connecting element 3 is flexible, especially of the spring type. Inertia block 2 at the end of connecting element 3, and the axial and/or radial stiffness of connecting element 3 are known. It is therefore easy to calculate, in an analytical and/or numerical and/or experimental manner, the deformation of the assembly as a function of an applied acceleration.

Several solutions are possible to take advantage of this behaviour and these are illustrated by the Figures.

Shock indicator device 1 includes a structure 10, to which is fixed at least one inertia block 2, by means of at least one connecting element 3 made of elastic or ductile or breakable material, which is elastically and plastically deformable when movements are imparted to the corresponding inertia block 2.

In a particular and non-limiting manner, this connecting element 3 is fitted, either directly in structure 10, or in a base 31 that is placed and fixed on the structure, or the like.

According to the invention, at least one inertia block 2 is movable in proximity to a fixed opposing surface 5, comprised in structure 10, or comprised in another element 120 of a watch case 110.

Figure 6:
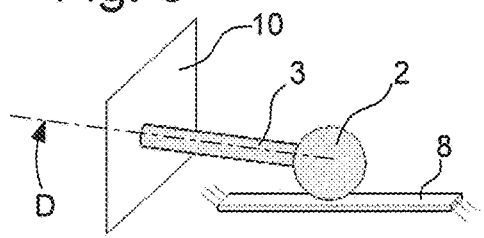
FIG. 6 represents, in a similar manner to FIG. 1, another variant wherein the inertia block is arranged to strike a breakable material on a breakable element arranged close to the inner surface of the housing, and to break said material when said inertia block strikes against a wall, when the inertia block is subjected to an acceleration higher than the lower acceleration threshold.

This inertia block 2 is arranged to come into contact with opposing surface 5, when the acceleration imparted to this at least one inertia block 2 is higher than a given lower acceleration threshold, so as to impart a proof indicator of impact or a permanent deformation or damage to inertia block 2 and/or to connecting element 3 and/or to opposing surface 5, and/or to a breakable element 8 incorporated in shock indicator device 1, when the latter includes the same, as described below in a particular variant seen in FIG. 6 or 12.

The acceleration values relating to accidental shocks are generally on the order of 1500 g to 5000 g. The value of 1300 g can be retained as the given lower acceleration threshold.

More particularly, at least one inertia block 2 is paired with an opposing surface 5, particularly an inner surface, with which only said inertia block 2 cooperates, to form together a shock proof indicator 20. More particularly still, each inertia block 2 is paired with one such opposing surface 5, with which only said inertia block 2 cooperates, to form together one such shock proof indicator 20.

In variants, inertia block 2 and/or the component bearing opposing surface 5 is made of elastic or ductile or breakable material, which is elastically or plastically deformable when movements are imparted to said at least one inertia block 2.

In a particular embodiment, at least one such inertia block 2 is movable inside a housing 4 of structure 10, in proximity to an opposing surface 5, particularly an inner surface of a wall 6 of housing 4. This inertia block 2 is arranged therein to come into contact with opposing surface 5, particularly an inner surface, when the acceleration imparted to said at least one inertia block 2 is higher than a given lower acceleration threshold.

The invention can be realized in different ways, some of which are illustrated, in a non-limiting manner, by the Figures.

Firstly, it is seen that connecting element 3 may, according to the variant, be made of elastic or ductile or breakable material, and may be elastically or plastically deformable.

In the preferred variant wherein connecting element 3 is made of elastic material, connecting element 3 can take the form of a substantially straight elastic strip, or of a plurality of such elastic strips, which are especially, but not exclusively, parallel to each other, or comprise at least one helical spring 32, or a spiral spring, or the like.

The elastic strip is understood here in the broadest sense; it may be a prismatic, cylindrical or other support piece, solid or hollow, or a complex assembly of basic support pieces.

In a variant, connecting element 3 may also include at least one wire, especially a torsion wire. In a particular variant, inertia block 2 is simply arranged between two taut wires.

Such a connecting element 3, which preferably has a high elastic limit, is elastically deformable within the entire range of accelerations for which the watch is designed, and is designed to return to its rest position, which allows several shocks to be recorded with the same inertia block 20, and the invention thus endeavours to determine the order of magnitude of the maximum acceleration to which inertia block 2 has been subjected, and also the direction of acceleration with respect to case 110 of watch 100. Connecting element 3 may be made, in particular, of a micromachinable material, such as silicon, DLC or the like, by a MEMS or LIGA or similar process, or be made of a spring steel for horology having a modulus of elasticity higher than 200 GPa, or a similar material.

When connecting element 3, or inertia block 2, or the component bearing opposing surface 5, is made of a material with a lower elastic limit, the elastic range is very narrow, and connecting element 3, or inertia block 2, or the component bearing opposing surface 5, experiences permanent plastic deformation under the effect of an acceleration or a relatively small shock, which is easily observed in after-sales service. Connecting element 3, or inertia block 2, or the component bearing opposing surface 5, may then be made of a light alloy, for example an aluminium alloy, or a precious alloy made from silver or gold, or another material with a modulus of elasticity lower than 70 GPa.

In the particular variant wherein shock indicator device 1 includes an element made of breakable material, for example connecting element 3, or a breakable element 8, this element made of breakable material is designed to break at a relatively low elastic limit threshold; however, this variant means that, as appropriate, connecting element 3, each breakable element 8, and inertia block 2 carried by connecting element 3, must be confined within a housing 4, either directly, if housing 4 is sealed and the mechanism of watch 100 is unlikely to be contaminated with debris, or enclosed in a flexible envelope 9 disposed inside housing 4, such that, in the event of damage to a connecting element 3, or to a breakable element 8, any debris from the damage remains confined within flexible envelope 9. This connecting element 3 or breakable element 8 can be made of a material with a modulus of elasticity lower than 50 GPa.

FIGS. 1 to 6, 8, 9 and 12 illustrate the case where connecting element 3 is bendable about an axis D, with respect to its point of attachment to structure 10. FIGS. 10 and 13 illustrate another variant wherein connecting element 3 is not simply bendable about an axis D relative to its point of attachment to structure 10, but is also axially movable in compression or extension about axis D, which allows shocks to be displayed in three dimensions. These variant embodiments of connecting element 3 are not limiting.

FIG. 14 illustrates another variant wherein an inertia block 2 is suspended to several connecting elements 3; in this particular case, a first connecting element 3A and a second connecting element 3B on either side of the inertia block, formed here in a non-limiting manner by helical springs 32A and 32B. Indeed, although the other Figures represent an assembly of connecting element 3 and inertia block 2 that is cantilevered relative to the attachment of connecting element 3, these are specific non-limiting examples, which also allow alternative features of the invention to be illustrated more simply.

In a particular application of this latter variant, when inertia block 2 is suspended to several connecting elements 3, these latter are not identical, and have different features, for example a first connecting element is arranged to experience permanent deformation in the plastic range, or to break, as soon as a first acceleration threshold is reached, a second connecting element is arranged to experience permanent deformation in the plastic range, or to break, as soon as a second acceleration threshold is reached, and so on.

In a variant, at least one connecting element 3 is made in one piece with the inertia block 2 that it carries.

In another variant, at least one connecting element 3 is made in one piece with the structure 10 that carries it.

In yet another variant, at least one connecting element 3 is made in one piece with the inertia block 2 that it carries, and with the structure 10 that carries the connecting element.

The torque between an inertia block 2 and an opposing surface 5, especially an inner surface, forming a shock proof indicator 20, is arranged to allow the marks of a significant shock to be viewed easily by a laboratory or after-sales technician. To this end, shock proof indicator 20 is arranged to leave a three-dimensional mark, and/or a visual mark, on inertia block 2 and/or on opposing surface 5, especially an inner surface.

In the embodiment of FIG. 2, in a shock proof indicator 20, at least one wall 6, and preferably every wall 6, is arranged to undergo an irreversible local deformation when struck by inertia block 2, when inertia block 2 is subjected to an acceleration higher than the lower acceleration threshold. FIG. 2 is illustrated in a simplified manner with only part of housing 4, with two inner surfaces 5 at right angles forming a dihedron, each bearing a deformation mark of different size, caused by an impact by inertia block 2 in different directions. Housing 4 can be the interior of a polyhedron, or of a surface of revolution about an axis coincident with a linear axis of connecting element 3, such as a cylinder, ellipsoid, sphere or the like. In particular, at least one opposing surface 5, especially an inner surface, arranged to cooperate with an inertia block 2, is cylindrical or spherical, to mark the presence of a shock in several degrees of freedom.

More particularly, and as seen in the non-limiting illustrated variants, at least one inertia block 2 is cylindrical or spherical, to mark the presence of a shock in several degrees of freedom.

In the embodiment of FIG. 2, inertia block 2 can irreversibly impact a deformable material, for example clay, or plasticine or suchlike, or more generally a wall 6 that is more ductile than inertia block 2. The surface and depth of the deformed area provide an indication as to the intensity of the maximum acceleration experienced by inertia block 2. In the example of FIG. 2, the grey area represents the depth to which the wall has been deformed in the wall's depth; the intensity is different here on the two axes. Inertia block 2 may be contained within a cubic housing 4, which can indicate accelerations along two axes. The best solution is for it to be contained within a cylindrical or spherical housing 4 to provide an indication along any axis, except its own axis generally, or even on its own axis in the example of FIG. 13.

Figure 8:
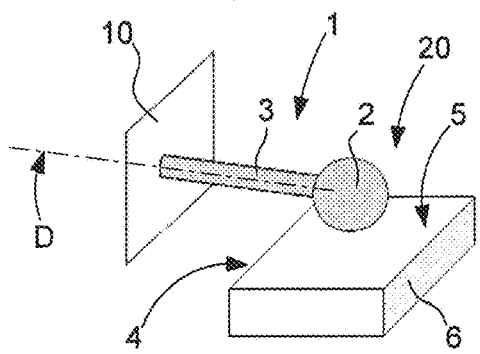
FIGS. 8 and 9 represent, in a similar manner to FIG. 2, respectively before and after impact, another variant wherein the inertia block is more ductile than the walls of the housing and is irreversibly deformed during an impact.
Figure 9:
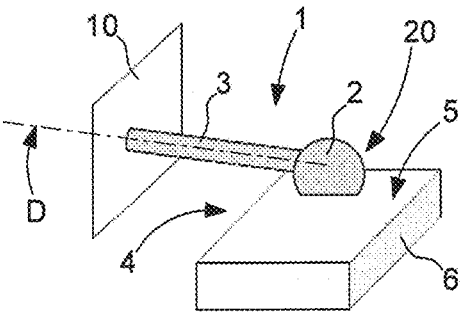

In the embodiment of FIGS. 8 and 9, in one shock proof indicator 20, walls 6 are less ductile than inertia block 2, which is arranged to undergo an irreversible local deformation when it collides with a wall 6, when the inertia block is subjected to an acceleration higher than the lower acceleration threshold. Inertia block 2 is, in this case, made of permanently deformable material. On striking against an opposing surface 5, especially a hard inner surface, of a steel, ruby or similar wall 6, especially an opposing surface 5, especially a flat inner surface, the mark remains visible, and its deformed shape allows determination of the maximum acceleration experienced.

Figure 3:
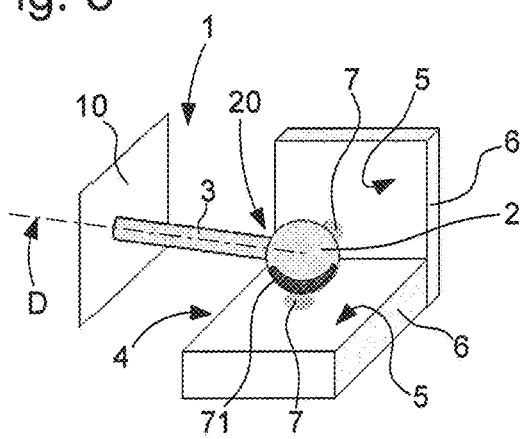
FIG. 3 represents, in a similar manner to FIG. 2, another variant wherein the walls of the housing are coated internally with a surface layer, arranged to be transferred onto the inertia block in the form of a transfer deposition, when struck by the inertia block.

In the embodiment of FIG. 3, in a shock proof indicator 20, at least one wall 6, and preferably every wall 6, is coated, on opposing surface 5, especially an inner surface, with a surface coating 7, which is arranged to be at least partially transferred onto inertia block 2 in the form of a transfer deposition 71, when struck by inertia block 2, when inertia block 2 is subjected to an acceleration higher than the lower acceleration threshold. This surface layer 7 may be a layer of ink or dye, an oxide powder, or a metallic powder, or a viscous product, such as grease, or otherwise. As in FIG. 2, FIG. 3 is illustrated in a simplified manner with only part of housing 4, with two inner surfaces 5 at right angles forming a dihedron, each bearing a transfer deposition of different size, caused by an impact by inertia block 2 in different directions.

Figure 5:
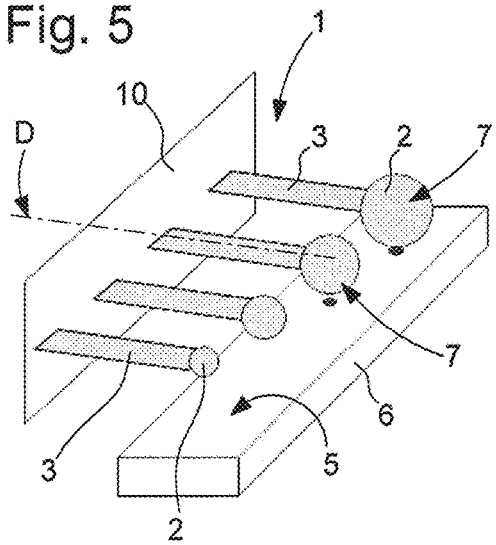
FIG. 5 represents, in a similar manner to FIG. 3, another variant of the shock indicator device, including a row of inertia blocks each with a different acceleration threshold, and wherein the walls of the inertia blocks are coated externally with a surface layer, arranged to be transferred onto the inner wall of the housing in the form of a transfer deposition, when struck by the inertia block.

FIG. 5 illustrates the reverse configuration of FIG. 3, wherein, in a shock proof indicator 20, it is inertia block 2 that is coated with a surface layer 7, which is arranged to be at least partially transferred onto opposing surface 5, especially an inner surface, when it collides with wall 6, when the inertia block is subjected to an acceleration higher than the lower acceleration threshold. Inertia block 2 can be coated with a layer of pigment or coloured ink or otherwise. On striking an opposing surface 5, especially an inner surface, a coloured deposition, which is very easy to see, is made on opposing surface 5, especially an inner surface. The areas coloured by the impact are of a similar size here on both axes since the deposition is a surface deposition. It is difficult to determine a precise acceleration value, but it is known that the acceleration experienced exceeded a given value. If the impacted wall 6 is made of a non-deformable material, several inertia blocks 2 can be used in parallel, as seen in FIG. 5. Determining which inertia block 2, or inertia blocks 2 deposited the colour indicates the maximum acceleration. The measurement is discretized and therefore more accurate than with a single inertia block 2.

Another variant concerns an opposing surface 5 which is a wall of structure 10 or of the other element 120 of watch case 110 and said wall is reversibly deformable. In particular, a wall 6 made of reversibly deformable material can be used, for example a foam, the diameter of the coloured area provides the indication of the maximum acceleration experienced with a reversible deformation of the impacted wall 6.

Figure 7:
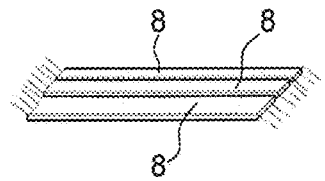
FIG. 7 represents a schematic and perspective view of another variant with a plurality of breakable elements, arranged to break under different acceleration thresholds, or arranged to cooperate with at least one inertia block according to the variant of FIG. 6.

FIGS. 6 and 12 illustrate a variant, wherein, in a shock proof indicator 20, inertia block 2 is arranged to strike a breakable material on a breakable element 8, which is arranged in proximity to opposing surface 5, especially an inner surface, and to at least partially break said breakable element 8 when it collides with inertia block 2 and/or a wall 6, when inertia block 2 is subjected to an acceleration higher than the lower acceleration threshold. The impacted breakable component 8 must be properly sized to break under a given impact force. In a particular variant, breakable component 8 is designed to break, alone, without inertia block 2, under the effect of an acceleration higher than the lower acceleration threshold. FIG. 7 illustrates several breakable components 8, each having a different bending resistance, and placed in parallel to give a more accurate indication of the acceleration experienced. This arrangement of FIG. 7 can cooperate, either with a single inertia block, or with a plurality of identical or different inertia blocks.

As seen in the variant of FIG. 12, in particular, when connecting element 3 and/or inertia block 2 and/or at least one breakable element 8 is designed to break upon impact when inertia block 2 is subjected to an acceleration higher than the lower acceleration threshold, the element concerned, or the elements concerned if there are more than one, is or are respectively enclosed, in at least one flexible envelope 9 inside housing 4 such that, in case of damage to this element or respectively to these elements, the debris from said damage remains enclosed in a flexible envelope 9. More particularly, at least one breakable element 8 is enclosed in a flexible envelope 9 inside housing 4 such that, in the event of damage to breakable element 8, the debris from said damage remains enclosed in flexible envelope 9, as seen in FIG. 12 which shows one such flexible envelope 9 enclosing a plurality of breakable elements 8 arranged on the generatrices of a cylindrical housing 4.

Thus, inertia block 2 can impact a breakable material such as ceramic, nickel phosphorus, sapphire, or suchlike, of breakable component 8. If said component is broken, it can be deduced that it has been struck by inertia block 2 and it is possible to determine the acceleration experienced.

As explained above, in another variant, it is possible to envisage omitting inertia block 2, and directly using the lack of bending resistance of breakable component 8 to calculate the acceleration experienced. Breakable component 8, which breaks on bending, can also be indented to create incipient breaks. If several breakable components 8 are used together, in the manner of a keyboard as seen in FIG. 7, each with a different geometry and/or a greater or lesser indentation, it is once again possible to determine more accurately the maximum acceleration experienced.

In particular, at least one housing 4 completely encloses an inertia block 2 and the at least one connecting element 3 which is associated with said inertia block 2. This configuration offers the advantage of preventing any contamination of the interior of watch 100, and also facilitates the tamper-proofing of the shock proof indicator 20 concerned. This housing 4 may, in particular, belong to an insert 30 whose position is indexed with respect to structure 10 and fixed to the latter, inside watch 100 and out of reach of the user. The after-sales service can then be performed on this insert 30 alone once it is removed from watch 100 and opened, this insert 30 then comprising a complete location system, identifying its position in the watch, and its angular position with respect to case 110 or watch 100.

Advantageously, to ensure tamper resistance, at least one housing 4 is sealed by a cap 41 inaccessible to the user of watch 100, as seen in FIG. 10 or 13.

Figure 4:
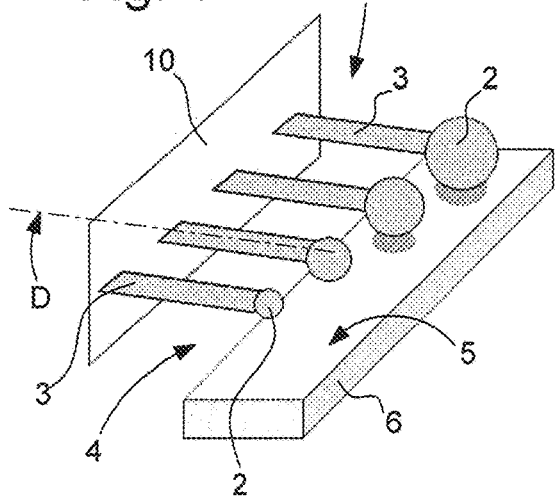
FIG. 4 represents, in a similar manner to FIG. 2, another variant of the shock indicator device, including a row of inertia blocks each with a different acceleration threshold.

In particular, as seen in FIGS. 4 and 5, device 1 includes a plurality of shock proof indicators 20, which are distinguished by different lower acceleration thresholds. It is then possible to determine the highest acceleration value exceeded during the life of the watch. Each inertia block 2 strikes the wall 6 that faces it with a different acceleration intensity, but only along one axis. FIG. 4 illustrates the variant using deformation, wherein the impacted wall 6 is irreversibly deformed, and FIG. 5 illustrates the variant with transfer deposition 71, and, in both cases, it is possible to determine the maximum acceleration value that has been exceeded.

FIG. 16 illustrates a variant, which is the reverse of the other illustrated variants, wherein a watch plate 10 includes two flexible strips 3 forming a V-shape, which are flexible in torsion, and which together carry a U-shaped inertia block 2, which surrounds a pin fixed in case middle 120 and which bears opposing surface 5.

The invention also concerns a watch 100 including at least one such shock indicator device 1.

More particularly, at least one structure 10 is fixed to an element 120 of case 110 comprised in watch 100, or is integral with case 110, or is a part of case 110, especially a case middle, or a back cover, or a flange, or a plate, or other.

The invention provides numerous advantages:
- ease of determination of the maximum acceleration experienced by the watch during testing or when worn by the customer;
- possibility of modulating the desired accuracy of the maximum acceleration value;
- ease of realization of the practical maximum acceleration measurement, by comparing the impact area with reference measurements;
- possibility of measuring on several axes, or even in three dimensions;
- possibility of fitting the shock indicator device inside a structural component of the watch, such as a case middle, plate, back cover, or the like, without requiring a projecting element with a variable position;
- ability to use any free space inside the watch for positioning the shock indicator device;
- ease of replacement of the device, with only one component to be changed after expert servicing;
- compactness of the device;
- low cost.

What is claimed is:

1. A shock indicator device for a watch, arranged to be inserted inside the watch, comprising:
   a structure;
   at least one inertia block; and
   at least one connecting element configured to fix the at least one inertia block to the structure and made of elastic or ductile or breakable material, which is elastically or plastically deformable when movements are imparted to said at least one inertia block, wherein
   said at least one inertia block is movable in proximity to a fixed opposing surface comprised in said structure itself or another element of a watch case,
   said at least one inertia block is arranged to conic into contact with said opposing surface, so as to impart a shock proof indicator of impact or a permanent deformation or damage to said at least one inertia block and/or to said connecting element and/or to said opposing surface, or to a breakable element incorporated in said shock indicator device, when an acceleration imparted to said at least one inertia block is higher than a given lower acceleration threshold, and
   an element of the device other than the at least one inertia block is configured to undergo a deformation when said inertia block is subjected to a higher acceleration than said lower acceleration threshold.

2. The shock indicator device according to claim 1, wherein said at least one inertia block and/or a component bearing said opposing surface is made of elastic or ductile or breakable material, which is elastically or plastically deformable when movements are imparted to said at least one inertia block.

3. The shock indicator device according to claim 1, wherein
   said opposing surface is a wall of said structure or of another element of a watch case, and
   said wall is reversibly deformable.

4. The shock indicator device according to claim 1, wherein at least one said opposing surface arranged to cooperate with said inertia block is cylindrical or spherical to mark a presence of a shock in several degrees of freedom.

5. The shock indicator device according to claim 1, wherein said at least one inertia block is cylindrical or spherical to mark a presence of a shock in several degrees of freedom.

6. The shock indicator device according to claim 1, wherein said at least one connecting element is a substantially straight, solid or tubular elastic strip.

7. The shock indicator device according to claim 1, wherein said at least one connecting element includes at least one wire.

8. The shock indicator device according to claim 1, wherein said at least one connecting element includes at least one helical spring or one spiral spring.

9. The shock indicator device according to claim 1, wherein at least one housing is sealed by a cap inaccessible to a user of said watch.

10. The shock indicator device according to claim 1, wherein said at least one inertia block is movable inside a housing of said structure in proximity to said opposing surface which is an inner surface of a wall of said housing and is arranged to come into contact with said opposing surface, when the acceleration imparted to said at least one inertia block is higher than the given lower acceleration threshold.

11. The shock indicator device according to claim 10, wherein at least one said housing completely encloses said inertia block and said at least one connecting element associated with said inertia block.

12. The shock indicator device according to claim 1, wherein said device includes a plurality of said connecting elements.

13. The shock indicator device according to claim 12, wherein said connecting elements are not identical, and have different features, and are each arranged to experience a permanent deformation in the plastic range, or to break, as soon as an acceleration threshold, distinct from that of the other said connecting elements, is reached.

14. A watch including at least one said shock indicator device according to claim 1.

15. The watch according to claim 14, wherein at least one said structure is fixed to an element of a case of said watch or is integral with said case or is a part of said case.

16. The shock indicator according to claim 1, wherein said at least one inertia block is paired with said opposing surface with which only said at least one inertia block cooperates to form together a shock proof indicator.

17. The shock indicator device according to claim 16, wherein
   said at least one inertia block is movable inside a housing of said structure, in proximity to said opposing surface, which is an inner surface of a wall of said housing, and is arranged to come into contact with said opposing surface, when the acceleration imparted to said at least one inertia block is higher than the given lower acceleration threshold, and
   in said shock proof indicator, said wall is arranged to undergo a local irreversible deformation when struck by said inertia block when said inertia block is subjected to a higher acceleration than said lower acceleration threshold.

18. The shock indicator device according to claim 16, wherein
   said at least one inertia block is movable inside a housing of said structure, in proximity to said opposing surface, which is an inner surface of a wall of said housing, and is arranged to come into contact with said opposing surface, when the acceleration imparted to said at least one inertia block is higher than a given lower acceleration threshold, and
   in said shock proof indicator, said inertia block is arranged to undergo a local irreversible deformation on striking against said wall, when said inertia block is subjected to a higher acceleration than said lower acceleration threshold.

19. The shock indicator device according to claim 16, wherein
   said at least one inertia block is movable inside a housing of said structure in proximity to said opposing surface, which is an inner surface of a wall of said housing, and is arranged to come into contact with said opposing surface, when the acceleration imparted to said at least one inertia block is higher than the given lower acceleration threshold, and
   in said shock proof indicator, said all is coated, on said opposing surface, with a surface layer arranged to be at least partially transferred onto said inertia block when struck by said inertia block, when said inertia block is subjected to an acceleration higher than said lower acceleration threshold.

20. The shock indicator device according to claim 16, wherein
   said at least one inertia block is movable inside a housing of said structure in proximity to said opposing surface, which is an inner surface of a wall of said housing, and is arranged to come into contact with said opposing surface, when the acceleration imparted to said at least one inertia block is higher than the given lower acceleration threshold, and in said shock proof indicator, said inertia block is coated with a surface layer arranged to be at least partially transferred onto said opposing surface, when said inertia block strikes against said wall, when said inertia block is subjected to an acceleration higher than said lower acceleration threshold.

21. The shock indicator device according to claim 16, wherein said at least one inertia block is movable inside a housing of said structure in proximity to said opposing surface, which is an inner surface of a wall of said housing, and is arranged to come into contact with said opposing surface, when the acceleration imparted to said at least one inertia block is higher than the given lower acceleration threshold, and in said shock proof indicator, said inertia block is arranged to strike a breakable element arranged in proximity to said opposing surface, and to at least partially break said breakable element when the opposing surface collides with said at least one inertia block and/or with said wall, when said inertia block is subjected to a higher acceleration than said lower acceleration threshold.

22. The shock indicator device according to claim 21, wherein at least one said breakable element is enclosed in a flexible envelope inside said housing so that, in an event of damage to said breakable element, debris from said damage remains enclosed in said flexible envelope.

23. A shock indicator device for a watch, arranged to be inserted inside the watch, comprising:

a structure;

at least one inertia block; and at least one connecting element configured to fix the at least one inertia block to the structure and made of elastic or ductile or breakable material, which is elastically or plastically deformable when movements are imparted to said at least one inertia block, wherein said at least one inertia block is movable in proximity to a fixed opposing surface comprised in said structure itself or another element of a watch case, said at least one inertia block is arranged to come into contact with said opposing surface, so as to impart a shock proof indicator of impact or a permanent deformation or damage to said at least one inertia block and/or to said connecting element and/or to said opposing surface, or to a breakable element incorporated in said shock indicator device, when an acceleration imparted to said at least one inertia block is higher than a given lower acceleration threshold, and said device includes a plurality of said shock proof indicators which are distinguished by distinct lower acceleration thresholds.

* * * * *

UNITED STATES PATENT AND TRADEMARK OFFICE
CERTIFICATE OF CORRECTION

| | |
|---|---|
| PATENT NO. | : 11,281,162 B2 |
| APPLICATION NO. | : 16/021070 |
| DATED | : March 22, 2022 |
| INVENTOR(S) | : Deirdre Lenoir |

It is certified that error appears in the above-identified patent and that said Letters Patent is hereby corrected as shown below:

On the Title Page

On Page 2, Column 2, Item (56), under "OTHER PUBLICATIONS", Line 1, delete "Repott" and insert -- Report --, therefor.

In the Claims

In Column 9, Claim 1, Line 14, delete "conic" and insert -- come --, therefor.

Signed and Sealed this
Fourteenth Day of June, 2022

Katherine Kelly Vidal
*Director of the United States Patent and Trademark Office*